United States Patent
Bonetta et al.

(10) Patent No.: US 9,766,926 B2
(45) Date of Patent: Sep. 19, 2017

(54) METHOD AND SYSTEM FOR OPTIMIZING PARALLEL PROGRAM EXECUTION BASED ON SPECULATION THAT AN OBJECT WRITTEN TO IS NOT SHARED

(71) Applicant: Oracle International Corporation, Redwood Shores, CA (US)

(72) Inventors: Daniele Bonetta, Vienna (AT); Thomas Wuerthinger, Utzenaich (AT)

(73) Assignee: Oracle International Corporation, Redwood Shores, CA (US)

( * ) Notice: Subject to any disclaimer, the term of this patent is extended or adjusted under 35 U.S.C. 154(b) by 371 days.

(21) Appl. No.: 14/170,506

(22) Filed: Jan. 31, 2014

(65) Prior Publication Data

US 2015/0081988 A1 Mar. 19, 2015

Related U.S. Application Data

(60) Provisional application No. 61/877,778, filed on Sep. 13, 2013.

(51) Int. Cl.
*G06F 9/46* (2006.01)
*G06F 9/38* (2006.01)

(52) U.S. Cl.
CPC .......... *G06F 9/467* (2013.01); *G06F 9/38* (2013.01)

(58) Field of Classification Search
None
See application file for complete search history.

(56) References Cited

U.S. PATENT DOCUMENTS

| | | | |
|---|---|---|---|
| 2007/0239915 A1* | 10/2007 | Saha | G06F 9/526 710/200 |
| 2009/0113443 A1* | 4/2009 | Heller, Jr. | G06F 9/3004 718/106 |
| 2010/0169870 A1* | 7/2010 | Dice | G06F 8/4441 717/141 |

(Continued)

OTHER PUBLICATIONS

Mehrara, M., et al., "Dynamic Parallelization of JavaScript Applications Using an Ultra-lightweight Speculation Mechanism", University of Michigan, Feb. 12-16, 2011 (pp. 87-98).

(Continued)

*Primary Examiner* — Meng An
*Assistant Examiner* — Michael Ayers
(74) *Attorney, Agent, or Firm* — Osha Liang LLP

(57) ABSTRACT

A method for executing a program in parallel includes creating a program replica, which includes a write operation on and an identifier of an object and is a copy of the program, for a thread. The identifier specifies whether the object is thread-local. The method includes modifying the write operation based on a speculation that the write operation uses only thread-local objects. The write operation executes in a transaction of the thread. The method includes determining, while executing the program replica and using the identifier, that the object used by the write operation is not thread-local, de-optimizing the write operation by adding instrumentation to implement a software transactional memory (STM) system for the write operation to obtain a de-optimized write operation, and performing the de-optimized write operation on the object to obtain a result and store the result in a redo log.

14 Claims, 7 Drawing Sheets

(56) References Cited

U.S. PATENT DOCUMENTS

| | | | | |
|---|---|---|---|---|
| 2010/0211931 A1* | 8/2010 | Levanoni | ............... | G06F 9/466 717/122 |
| 2011/0145512 A1* | 6/2011 | Adl-Tabatabai | ........ | G06F 9/466 711/141 |
| 2011/0145553 A1* | 6/2011 | Levanoni | ............... | G06F 9/466 712/229 |
| 2011/0145637 A1* | 6/2011 | Gray | .................... | G06F 11/141 714/15 |
| 2011/0246724 A1* | 10/2011 | Marathe | ................ | G06F 9/467 711/147 |
| 2012/0324472 A1* | 12/2012 | Rossbach | ............... | G06F 9/467 718/106 |

OTHER PUBLICATIONS

Dragojevic, A., et al., "Stretching Transactional Memory", Dublin, Ireland, Jun. 15-20, 2009 (11 pages).

Damron, P., et al., "Hybrid Transactional Memory", Sun Microsystems Laboratories, San Jose, California, Oct. 21-25, 2006 (11 pages).

Dalessandro, L., et al., "NOrec: Streamline STM by Abolishing Ownership Records", Bangalore, India, Jan. 9-14, 2010 (pp. 67-77).

Zhang, M., et al., "LarkTM: Efficient, Strongy Atomic Software Transactional Memory", Ohio State University, updated Nov. 2013 (12 pages).

Schneider, F., et al., "Dynamic Optimization for Efficient Strong Atomicity", Nashville, Tennessee, Oct. 19-23, 2008 (13 pages).

Korland, G., et al., "Noninvasive concurrency with Java STM", Sun Microsystems, Jan. 2010 (14 pages).

Harris, T., et al., "Optimizing Memory Transactions", Ontario, Canada, Jun. 11-14, 2006 (12 pages).

Hindman, B., et al., "Atomicity via Source-to Source Translation", San Jose, California, Oct. 22, 2006 (10 pages).

Tabatabai, A., et al., "Compiler and Runtime Support for Efficient Software Transactional Memory", Ontario, Canada, Jun. 10-16, 2006 (pp. 26-37).

Bronson, N., et al., "Feedback-Directed Barrier Optimization in a Strongly Isolated STM", Proceedings of the 36th annual ACM SIGPLAN-SIGACT symposium on Principals of Programming Language, Jan. 2009 (13 pages).

Bonetta, D., et al., "TigerQuoll: Parallel Event-based JavaScript", Shenzhen, China, Feb. 23-27, 2013 (10 pages).

\* cited by examiner

METHOD AND SYSTEM FOR OPTIMIZING PARALLEL PROGRAM EXECUTION BASED ON SPECULATION THAT AN OBJECT WRITTEN TO IS NOT SHARED

CROSS REFERENCE TO RELATED APPLICATIONS

This application claims benefit under 35 U.S.C. §119(e) to U.S. Provisional Patent Application Ser. No. 61/877,778, filed on Sep. 13, 2013 and entitled, "A METHOD AND SYSTEM FOR PARALLEL PROGRAM EXECUTION." U.S. Provisional Patent Application Ser. No. 61/877,778 is incorporated herein by reference in its entirety.

BACKGROUND

When a computer program is to be executed, portions of the program may be executed sequentially. The sequential execution of the program may lead to processing capability of the computer being under-utilized. Under-utilization of the processing capability may be mitigated by executing some portions of the program in parallel with other portions. In order to execute a program in parallel, the execution should account for data dependencies in memory.

SUMMARY

In general, in one aspect, the invention relates to a method for parallel execution of programs that includes, while executing a program in parallel, creating a program replica for a thread. The program replica includes a write operation on a object, a identifier of the object specifying whether the object is thread-local. The program replica corresponds to a copy of the program. The method also includes modifying the write operation based on a speculation that the write operation uses only thread-local objects. The write operation executes in a transaction of the thread. The method additionally includes determining, while executing the program replica and using the identifier, that the object used by the write operation is not thread-local, as well as de-optimizing the write operation by adding instrumentation to implement a software transactional memory (STM) system for the write operation to obtain a de-optimized write operation. The method further includes performing the de-optimized write operation on the object to obtain a result and storing the result in a redo log, based on the determination that the write operation is performed on the object which is not thread-local.

In general, in one aspect, the invention relates to a system for parallel execution of programs that includes a data repository for storing a read log, a redo log, and at least one program replica, multiple threads, a software transactional memory (STM) system and a speculative runtime engine. The speculative runtime engine includes functionality to create a program replica for a thread. The program replica includes a write operation on a object and a identifier of the object specifying whether the object is thread-local. The program replica corresponds to a copy of the program. The speculative runtime engine also includes functionality to modify the write operation based on a speculation that the write operation uses only thread-local objects. The write operation executes in a transaction of the thread. The speculative runtime engine also includes functionality to determine, while executing the program replica and using the identifier, that the object used by the write operation is not thread-local and de-optimize the write operation by adding instrumentation to implement the STM system for the write operation to obtain a de-optimized write operation. The system also includes an interpreter. The interpreter includes functionality to perform the operation on the object to obtain a result and perform the second operation on a second object to obtain a second result.

In general, in one aspect, the invention relates to a non-transitory computer readable medium that includes instructions which, when executed by a computer, cause a computer processor to, while executing a program in parallel, create a program replica for a thread. The program replica includes a write operation on a object and a identifier of the object specifying whether the object is thread-local. The program replica corresponds to a copy of the program. The instructions also causes a computer processor to modify the write operation based on a speculation that the write operation uses only thread-local objects. The write operation executes in a transaction of the thread. The instructions also causes a computer processor to determine, while executing the program replica and using the identifier, that the object used by the write operation is not thread-local. The instructions additionally causes a computer processor to de-optimize the write operation by adding instrumentation to implement a software transactional memory (STM) system for the write operation to obtain a de-optimized write operation. The instructions also causes a computer processor to perform the de-optimized write operation on the object to obtain a result and store the result in a redo log, based on the determination that the write operation is performed on the object which is not thread-local.

DETAILED DESCRIPTION

Figure 1:
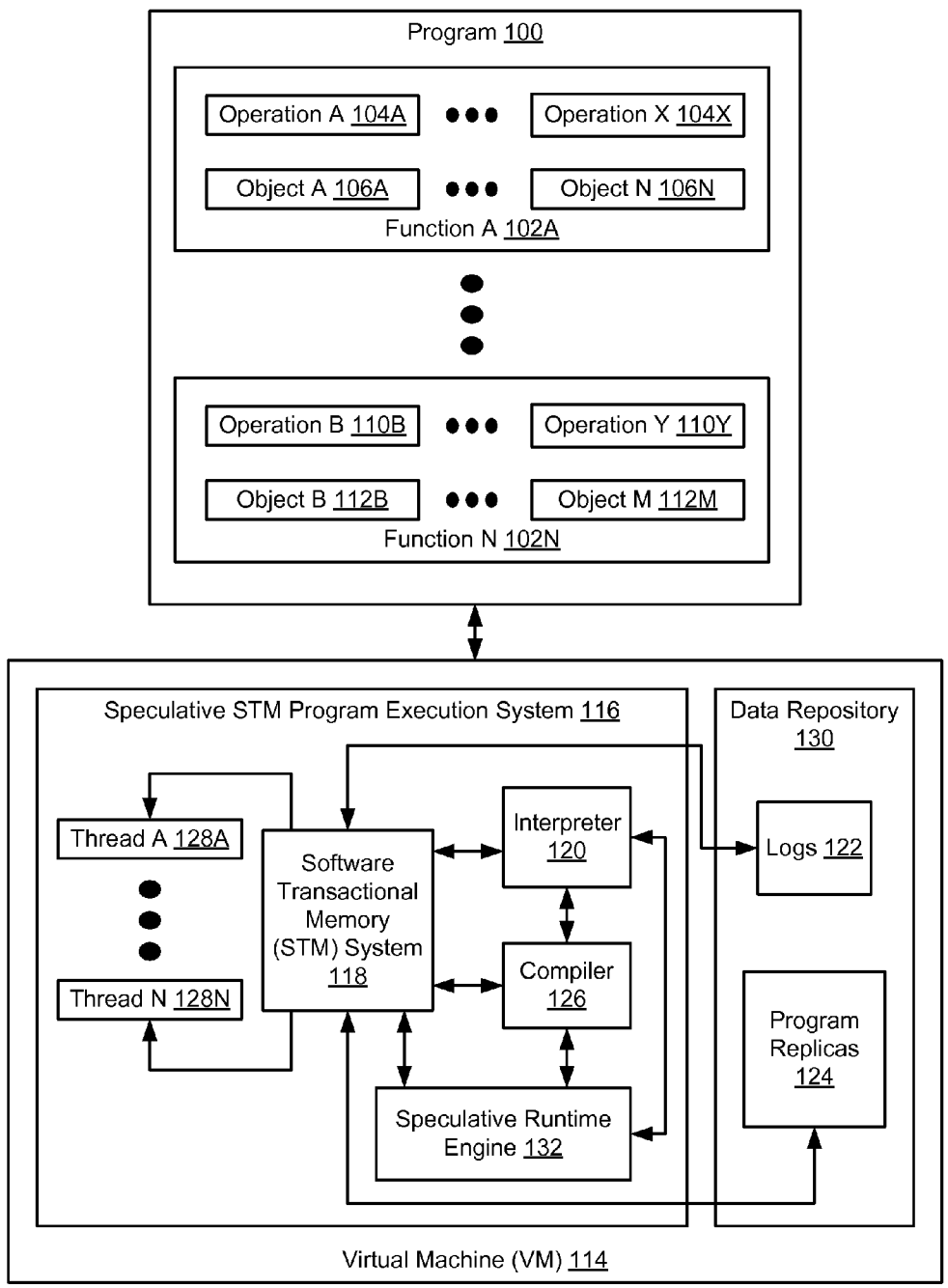
FIG. 1 shows a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the inventions relate to a method and system for the execution of a program. More specifically, in one or more embodiments of the invention, a software transactional memory (STM) system is combined with a speculative runtime engine to create a speculative STM program execution system. One or more embodiments of the invention include functionality to speculate that operations will use only thread-local objects, as well as to modify the operation based on the speculation. In one or more embodiments of the invention, execution of the program within the speculative STM program execution system may reduce the overhead related to the management of data structures (i.e., metadata) used to implement a STM system.

FIG. 1 shows a system in accordance with one or more embodiments of the invention. As shown in FIG. 1, the system includes a program (e.g., program (100)). A program is a sequence of instructions written to perform one or more operations (e.g., operation A (104A)-operation X (104X), operation B (110B)-operation Y (110Y)) as a part of one or more functions (e.g., function A (102A)-function N (102N)) on a computing device such as a virtual machine (VM) (e.g., VM (114)), a mobile device (e.g., laptop computer, smart phone, personal digital assistant, tablet computer, or other mobile device), desktop computer, server, blade in a server chassis, or any other type of computing device or devices that includes at least the minimum processing power, memory, and input and output device(s) to perform one or more embodiments of the invention. The program may be written in a programming language, which is a syntactic and semantic method of expression for communicating the program's instructions to a computing device. The program may be executed by being interpreted and executed by an interpreter, compiled and executed, or executed via a combination of interpretation and compilation.

In one or more embodiments of the invention, the program includes one or more functions. A function is a set of operations that act on one or more objects (e.g., object A (106A), object N (106N), object B (112B), object M (112M)). In one or more embodiments of the invention, in some programming languages, a function is an object. Functions are discussed further in the description of FIG. 2 below.

In one or more embodiments of the invention, an operation is a request for an action to be performed on an object. For example, an operation (e.g., operation A (104A)) may read a value from an object or a write a value to an object. In one or more embodiments of the invention, an operation may also create an object. In one or more embodiments of the invention, an operation is an access of one or more properties of an object. Operations are discussed further in the description of FIG. 2 below.

In one embodiment of the invention, an object (e.g., object A (106A)) is a representation of data (e.g., numbers, strings, arrays, functions, etc.) via a collection of one or more properties, such as data attributes, and associated methods, such as routines and procedures to manipulate properties. A method of an object may be a function.

Although FIG. 1 shows objects (e.g., object 106A) within a function, in one or more embodiments of the invention, objects are not associated solely with any one function, program point, or transaction. Objects may include an identifier (not shown) that indicates if the object is a thread-local object or a shared object. Objects may be stored in memory, and pointers to the location in memory of an object may be passed between functions.

In one or more embodiments of the invention, object properties include other objects. In one or more embodiments of the invention, an object may be created via a prototype (not shown). A prototype is an object that may be used as a template for the creation of new objects, whereby the new objects inherit the properties and/or methods of the prototype object. In one or more embodiments of the invention, an object is an instance of a class (not shown). A class defines the type of an object, and the type defines what manner of values an object may have, what methods may operate on the object, and how the object is to be stored.

In one or more embodiments of the invention, each object has a shape (i.e., hidden class). Object shapes are data structures that record the properties and methods of an object during runtime (i.e., during program execution). In one or more embodiments of the invention, object shapes change dynamically during runtime. Object shapes may be used to determine information about specific properties of an object during runtime, as objects with the same shape often have properties in common. For example, two objects that have the same shape have the same internal layout, meaning that the properties of the objects may be stored in memory in a manner that is consistent between objects, which reduces the need for an operation to determine the structure of the object before performing an action. As another example, the shape of an object may provide information regarding the scope in which the object was created. In one or more embodiments of the invention, object shapes are assigned/determined based on a copy of the intermediate representation of a program local to a thread in which a transaction (not shown) is executing. Copies of the intermediate representation of the program local to a thread (i.e., a program replicas) are discussed further in the description of FIG. 2 below.

In one or more embodiments of the invention, the program (or portions of the program such as functions) is executed in one or more transactions (not shown). A transaction is a task (not shown) that may share objects with one or more concurrently executing transactions. A task is defined via an entry point into the program and includes functionality to execute one or more operations of one or more functions of the program.

A transaction/task may execute in a thread (e.g., thread A (128A), thread N (128N)). A thread is a logically separate (i.e., isolated) instruction execution stream in which tasks and/or transactions may be executed by a processor. A thread may have a thread queue (not shown) in which one or more operations and/or functions are placed to schedule execution by the processor associated with the thread. In one or more embodiments of the invention, a computing device with more than one logical processor includes one thread per logical processor. For example, if a computing device has eight processors, each with hyperthreading enabled, then the system may maintain sixteen threads. Each of the sixteen threads may have a thread queue in which functions or operations may be placed to be executed according to the designed execution parameters of a system. For example, the functions or operations may be executed in the same order as the functions or operations are placed in the queue, or may be executed based on a priority ranking system. Alternately, one thread per physical processor, or two or more threads per physical or logical processor, or any other number of threads configured to take advantage of the resources of a computing device may exist. Execution of a task as an isolated transaction may ensure that multiple transactions potentially operating on shared objects may be executed in parallel without interfering with one another.

In one or more embodiments of the invention, the execution of a transaction is guaranteed to be both isolated and atomic. In one or more embodiments of the invention, isolated execution means that no other transaction will be affected by a running transaction until the running transaction has completed. In one or more embodiments of the invention, atomic execution means that objects created and modified by a transaction will become visible to other transactions as if the operations creating or modifying the objects were executed as a single instruction performed as a sequential step of program execution. In other words, atomic execution may guarantee that other executing transactions/threads do not see intermediate states of objects that are modified in the course of transaction execution. The program (e.g., program (100)) may spawn one or more tasks and/or transactions which, in turn, may also spawn additional tasks and/or transactions.

In one or more embodiments of the invention, a transaction executes and/or is scheduled in a specific thread, which may execute multiple transactions serially. In one or more embodiments of the invention, a transaction executes the programming language code (or a portion thereof) of a program. A transaction may begin with a selected entry function, which may in turn call other functions (which may, in turn, call other functions, etc.) that execute within the transaction. In one or more embodiments of the invention, a transaction completes when the execution returns from the initial entry function.

In one or more embodiments of the invention, the program is designed to be executed in a VM (e.g., VM 114). A VM is a software implementation of a computing device executing on an underlying computing device. A VM may abstract the operating system and hardware of the underlying computing device from instructions (e.g., instructions of program (100)) that are executed in the VM.

In one or more embodiments of the invention, the VM includes functionality to execute programs (e.g., program (100)). In one or more embodiments of the invention, the VM includes functionality to allow execution of a single version of a software program on a variety of operating systems (not shown) and hardware systems (not shown). Although not shown in FIG. 1, in one or more embodiments of the invention, the program executes directly on a computing device or via its operating system rather than within the construct of a VM, provided that the computing device/operating system has a speculative STM program execution system (e.g., speculative STM program execution system (116)) with speculative and STM functionality that is designed to execute programs on the computing device/operating system.

In one or more embodiments of the invention, the VM includes a speculative STM program execution system (e.g., speculative STM program execution system (116)). In one or more embodiments of the invention, the speculative STM program execution system includes a speculative runtime engine (e.g., speculative runtime engine (132)). In one or more embodiments of the invention, the speculative runtime engine is operatively connected to the STM system, as well as to an interpreter (e.g. interpreter (120)) and a compiler (e.g., compiler (126)).

In one or more embodiments of the invention, a speculative STM program execution system is a program execution system in which the speculative runtime engine includes functionality to speculate about an operation and, based on the speculation, modify operations and/or deoptimize the operations in the event that speculation fails. Speculation is a technique in which the program execution system makes assumptions (i.e., speculates) about some aspect of the program execution and performs modifications intended to alter some aspect of program execution (e.g., execution speed). In one or more embodiments of the invention, the speculative runtime engine (132) includes functionality to, during program execution, keep record of various aspects of program execution, and to modify portions of the program based on the data collected. For example, the speculative runtime engine (132) may modify the intermediate representation (e.g., AST) of a program to include compiled (e.g., optimized) machine code rather than an AST node for an operation that the speculative runtime engine has determined, based on the recorded data about program execution, may be executed more efficiently via compilation than by interpretation. In one or more embodiments of the invention, the speculative runtime engine includes functionality to, in the event that the speculation is incorrect, undo (i.e., deoptimize) previously made modifications of operations and execute unmodified or differently modified operations instead.

In one or more embodiments of the invention, the speculative runtime engine includes functionality to speculate that an operation (e.g., operation Y (110Y)) has always, within the context of a program replica (e.g., program replicas (124)) executing as a transaction in a thread (e.g., thread A (128A)), acted on only thread-local objects and thus will continue to do so in the future. For example, in one or more embodiments of the invention, the speculative runtime engine includes functionality to, per thread, replace operations of the program with modified versions based on a speculation that because a given operation has only used thread-local objects in the past, the operation will continue to only use thread-local objects in the future. Modifications may include modifying read and write operations to directly manipulate objects without the overhead incurred by a STM system (e.g., STM system (118)). In one or more embodiments of the invention, if the speculative runtime engine later determines that the speculation was incorrect (i.e., the operation is acting on a shared object), then the modified version of the operation is replaced with a de-optimized version of the operation. A de-optimized version of an operation may be one that includes the overhead necessary to implement a STM system, or may be the operation as originally interpreted for single-threaded execution. In one or more embodiments of the invention, the deoptimized version of an operation that has been compiled is a less optimized version of the compiled machine code. For example, the less optimized version may be a version created by a baseline compiler rather than the compiler (126) of the speculative STM program execution system (116). Thus, the deoptimized version may also be a compiled version, but only compiled by a baseline compiler without optimization included.

In one or more embodiments of the invention, the speculative STM program execution system (e.g., speculative STM program execution system (116)) includes functionality to execute a program (e.g., program (100)) using modifications based on profiling information (not shown) and an intermediate representation of the program (e.g., the program replicas (124)) to, for example, improve the execution speed of the program (100). In one or more embodiments of the invention, the modified version of the operations is provided by the compiler (126).

In one or more embodiments of the invention, profiling information (not shown) is data gathered by the speculative runtime engine during execution of a program (i.e., at runtime) about various aspects of the execution. In one or more embodiments of the invention, profiling information is used to perform speculation. Profiling information may include, but is not limited to: whether an operation has used, in previous executions of the operation, local or shared objects; the number of times a unit of code (e.g., a node, a loop, a method, etc.) has been executed; how recently intermediate representation of the program (or a portion thereof) has been dynamically changed; the actual values, value ranges, and/or types of inputs given to an operation at runtime; etc.

In one or more embodiments of the invention, the speculative STM program execution system includes an interpreter (e.g. interpreter (120)). In one or more embodiments of the invention, an interpreter is a computer program designed to translate the source code of a program into an intermediate representation and to execute the intermediate representation of the program without necessarily compiling the program into machine code. In one or more embodiments of the invention, the interpreter is any kind of interpreter for any programming language now known or later developed. The intermediate representation of the program may take many different forms including, but not limited to: abstract syntax trees (AST), bytecodes, and/or any other suitable forms. In one or more embodiments of the invention, intermediate representation of the program may include profiling information (not shown).

In one or more embodiments of the invention, the speculative STM program execution engine also includes a compiler (e.g., compiler (126)) operatively connected to the interpreter. As shown in FIG. 1, the compiler is a computer program designed to transform source code written in a programming language, or intermediate representation of a program, into machine code that is capable of being executed in a VM (e.g., VM (114)). In one or more embodiments of the invention, the compiler includes functionality to translate the intermediate representation of the program into machine code that the VM is configured to execute. For example, the compiler may include functionality to create machine code that, when executed in lieu of direct execution of the intermediate representation of the program, improves the execution speed of the program (100). In one or more embodiments of the invention, the compiler includes functionality to perform compilation of operations or functions as the program is executing (e.g., just-in-time (JIT) compilation).

In one or more embodiments of the invention, the speculative STM program execution engine also includes a software transactional memory (STM) system (e.g., STM system (118)). As shown in FIG. 1, the STM system is a mechanism for controlling access to memory shared between concurrently executing transactions and is implemented by the speculative runtime engine via instrumentation (not shown) added to each thread's copy of the intermediate representation of the program. For example, in a computing device with more than one processing core, transactions that need access to properties of objects in shared memory may execute concurrently in threads executing on two or more processing cores of the computing device. In one or more embodiments of the invention, a STM system allows the transactions to safely execute in isolation from one another. In one or more embodiments of the invention, the STM system is implemented by the speculative runtime engine modifying, replacing, or adding to replicas of the intermediate representation of the program. For example, if the intermediate representation of the program is an AST, and the AST has been replicated per thread of a system, then the STM system may be implemented by modifying or replacing AST nodes for read and write operations as well as adding AST nodes for validation and commit operations (not shown). In one or more embodiments of the invention, validate and commit operations are not part of every function, but instead are operations that are performed after a transaction has executed (i.e., returned from its entry function).

In one or more embodiments of the invention, the STM system uses data structures (e.g., logs (122) and/or cloned objects (not shown)) for recording the reads and writes that occur during a transaction for later use in validation. In one or more embodiments of the invention, the data structures are stored in a data repository (e.g., data repository (130)) operatively connected to the speculative STM program execution system. In one or more embodiments of the invention, the data repository is any type of storage unit and/or device (e.g., a file system, database, collection of tables, memory, or any other storage mechanism) for storing data. Further, the data repository may include multiple different storage units and/or devices. The multiple different storage units and/or devices may or may not be of the same type or located at the same physical site.

In one or more embodiments of the invention, a log is a collection of data gathered during execution of the transaction about the operations that occurred during the transaction. For example, the logs may include information about the values of objects that have been read or written to during transactions. In one embodiment of the invention, the logs include a read log for recording read operations performed in a transaction and a redo (i.e., write) log for recording write operations performed in a transaction. In one or more embodiments of the invention, both the read and redo log are private to a particular transaction executed in a thread. Use of the logs in validating the transaction is discussed further in the description of FIG. 3B below.

In one or more embodiments of the invention, the data structures used by the STM system to record operations performed on objects include a combination of lazy clones (not shown) and logs (e.g., logs (122)). A lazy clone may be a copy of an object that is potentially shared between transactions in an STM system. In one or more embodiments of the invention, a lazy clone is created per thread and per operation when the operation attempts to access properties of a potentially shared object. In other words, in one or more embodiments of the invention, lazy clones of objects are associated with the specific transaction for which the lazy clone was created. A lazy clone initially has an empty shape (i.e., no properties are copied), which is why the clone is called "lazy". In one or more embodiments of the invention, the properties and values of the lazy clone object are populated on an "as needed" basis when an operation acts on a specific property of the original object. The populating is performed by importing the property from the original object into the lazy clone. The lazy clone's existence and location may be recorded in the read and/or redo log for later use in validation. In one or more embodiments of the invention, only an initial access of a property causes an import of a property to a lazy clone, with additional accesses of the property using the property already imported into the lazy clone rather that re-importing the value from the shared object.

In one or more embodiments of the invention, the STM system includes functionality to, at the end of the transactions, perform a validation using the data structures (e.g., logs (122) and/or lazy clones (not shown)) created to record results of operations on properties of objects shared between transactions. In one or more embodiments of the invention, if the validation is successful, the STM system includes functionality to commit the results of the write operations performed during a transaction. In one or more embodiments of the invention, if the validation fails, one or more transactions are re-executed until the validation succeeds. In one or more embodiments of the invention, the state of any transaction executed in the STM system is not visible to any other transaction until the commit operation completes following a successful validation. In one or more embodiments of the invention, the STM system may be designed to not allow write operations performed in a transaction to be committed unless the validation succeeds. Validation is discussed in more detail in the discussion of FIG. 3B below.

In one or more embodiments of the invention, the speculative runtime engine, when implementing the STM system, also includes functionality to modify intermediate representation of operations (e.g., AST nodes) based on other data gleaned from the profiling data that the speculative runtime engine maintains. For example, the profiling information includes information about the properties of objects an operation has acted on in the context of a thread, as well as the type of the property (e.g., integer, string, array, Boolean, etc.). In one or more embodiments of the invention, the speculative runtime engine includes functionality to examine the profiling information and, in the event a given operation has always accessed the same property of an object and/or accessed object properties of the same type, to further modify the AST node that is implementing the STM system version of the operation to assume (i.e., speculate) that the operation will always access the same property and that the property will always be the same type. The speculation may reduce overhead associated with determining the location of a given property within the object in memory by allowing access to the property at a fixed offset, as well as allowing the operation to know the type of a property without the need for determining the type.

In one or more embodiments of the invention, the speculative STM program execution system also includes program replicas (e.g., program replicas (124)). In one or more embodiments of the invention, the program replicas are stored in the data repository. Program replicas are replications of the intermediate representation of the program, or a portion thereof (e.g., a function), selected for parallel execution in transactions executing in two or more threads. The speculative runtime engine may replicate the intermediate representation of the program per thread to implement the STM system. For example, if the program has been represented as an AST, the speculative runtime engine may replicate the full AST representation of a program per thread to create a program replica, or may replicate only a portion of the AST representation of the program for which parallel execution is desired, such as a function (e.g., function A), for each available thread of the system. In one or more embodiments of the invention, the STM system includes commands that, when used to call functions (i.e., portions of a program), are designed to place the function in the thread queue of an available processor thread. Program replicas may or may not be exact copies of the same portion of the program. Program replicas may be replicas for different programs or portions of different programs. In one or more embodiments of the invention, program replicas evolve differently in each thread. For example, the operations that are modified, replaced, or added in a transaction of one thread may be different from the operations that are modified, replaced, or added to a transaction executing in a different thread. Program replicas may differ in the speculation state of the read and/or write operations of the program replicas. For example, because thread-local speculation includes a check against a thread-local identifier of an object, the read and/or write operations of a given program replica may specialize independently for a specific thread-local identifier.

While FIG. 1 shows a configuration of components, other configurations may be used without departing from the scope of the invention. For example, various components may be combined to create a single component. As another example, the functionality performed by a single component may be performed by two or more components.

Figure 2:
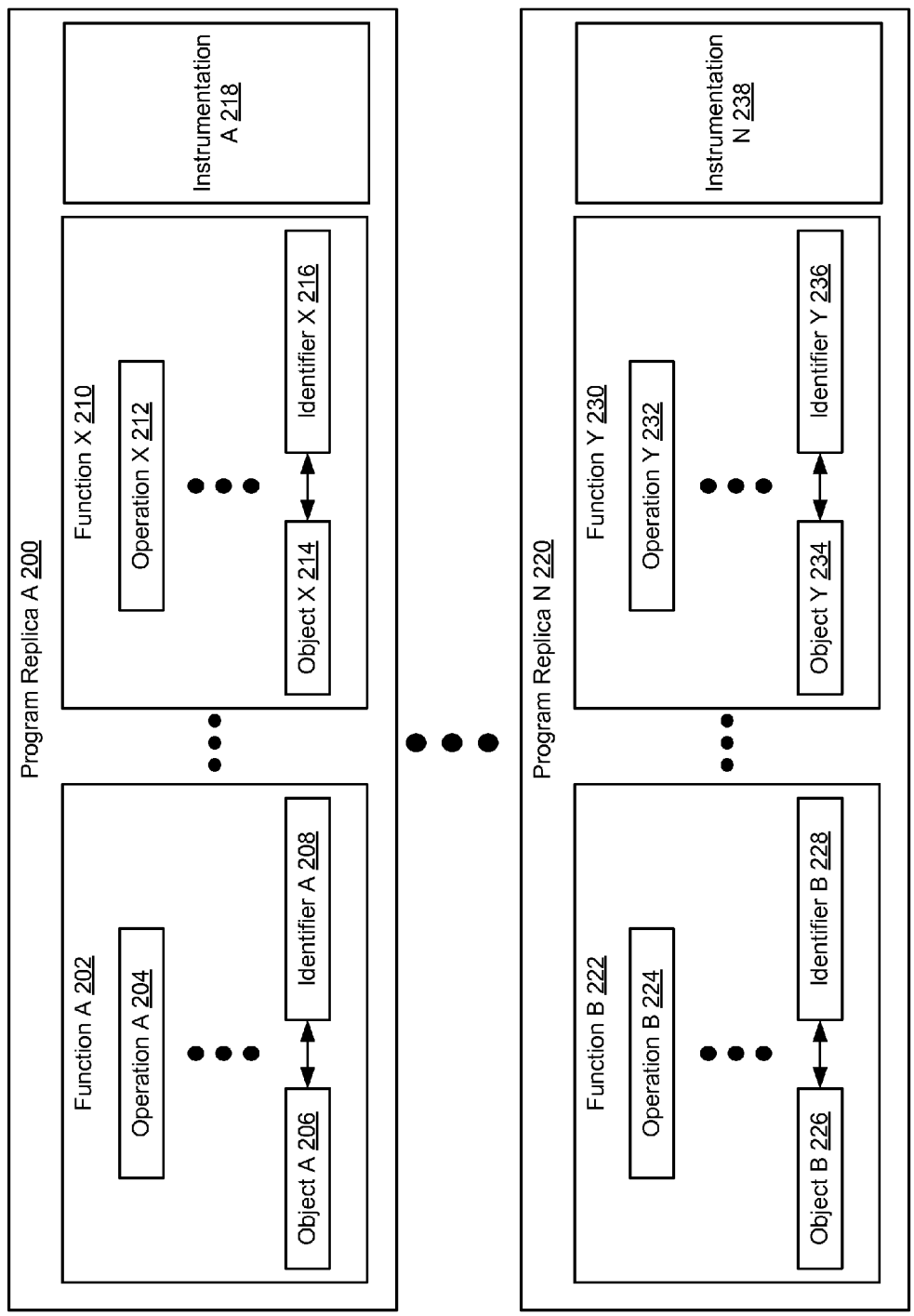
FIG. 2 shows transaction replicas in accordance with one or more embodiments of the invention.

Turning to FIG. 2, FIG. 2 shows program replicas in accordance with one or more embodiments of the invention. In one or more embodiments of the invention, each program replica (e.g., program replica A (200), program replica (220)) includes functions (e.g., function A (202), function X (210), function B (222), function Y (230)) and instrumentation (e.g., instrumentation A (218), instrumentation N (238)). Each function may include operations (e.g., operation A (204), operation X (212), operation B (224), operation Y (232)) which create, read from, write to, or otherwise manipulate objects (e.g., object A (206), object X (214), object B (226), object Y (234)). In one or more embodiments of the invention, each object has an identifier (e.g., identifier A (208), identifier X (216), identifier B (228), identifier Y (236)). Each of these components is described below.

In one or more embodiments of the invention, each program replica is substantially similar to the program replicas (124) of FIG. 1. A program replica may be created for each thread (e.g., thread A (128A), thread N (128N) of FIG. 1) of the system. In one or more embodiments of the invention, the program replica is a replication of the intermediate representation of the program. For example, the intermediate representation may be an AST or series of byte code instructions.

In one or more embodiments of the invention, the functionality, or a portion thereof, that the program is designed to perform is implemented by way of functions (e.g., function A (202), function X (210), function B (222), function Y (230)). A function is a subset of the source code of a program that is designed to perform one or more operations on one or more objects. In one or more embodiments of the invention, a function includes functionality to be called (i.e., invoked) by an entity such as another portion of the program, another function, or itself. A function may be an object and may be an element (e.g., a method) of other objects. In one or more embodiments of the invention, a function includes the ability to generate objects, including other functions. In one or more embodiments of the invention, functions, as a part of the larger program, are represented within the intermediate representation of the program. For example, if the intermediate program as a whole is an AST, then a function may be represented as one or more of the branches of the AST and the nodes corresponding to the branches (i.e., an abstract syntax "sub-tree"). Alternately, if the intermediate representation of the program is bytecode, then the function may be represented as one or more lines of bytecode within the program bytecode. In one or more embodiments of the invention, functions are the unit of the program that can be scheduled for concurrent (i.e., parallel) execution in two or more transactions executing in two or more threads of a system.

In one or more embodiments of the invention, each function includes one or more operations (e.g., operation A (204), operation X (212), operation B (224), operation Y (232)). Operations are substantially similar to the operations (e.g., operation A (104A)) described, in part, in the description of FIG. 1, above. An operation is a set of instructions for a computing device to execute which implements an action that is performed to achieve a result. Operations may be, but are not limited to, creation of an object, reads from an object, and writes to an object. Any number of operations may be included in a function to act on any number of objects. An operation, as a part of a function which, in turn, is part of the larger program, may initially be represented in the source code of the program. After the program has been represented as an intermediate representation by an interpreter, an operation may be a subset of the intermediate representation. For example, if the program is represented as an AST, and a function is represented as one or more branches of that AST, then operations are represented as nodes of the AST branches. In one or more embodiments of the invention, operations may be modified to include additional functionality. For example, operations may be instrumented to implement, or partially implement, an STM system (e.g., STM system (118) of FIG. 1). In one or more embodiments of the invention, an operation may be compiled machine code. In one or more embodiments of the invention, the same compiled machine code for some operations is used regardless of whether the operation is acting on thread-local objects or on shared objects. In one or more embodiments of the invention, a shared version of the object and a thread-local version of the object may exist in the compiled code. Thus, a version of the operation may act on the thread-local object in some instances and a shared object in other instances in accordance with one or more embodiments of the invention.

In one or more embodiments of the invention, the objects (e.g., object A (206), object X (214), object B (226), object Y (234)) on which operations act are substantially similar to the objects (e.g., object A (104A)) described, in part, in the description of FIG. 1, above. Objects may be created within a function. In one or more embodiments of the invention, objects created within a function are considered local to that function (i.e., thread-local objects). In one or more embodiments of the invention, thread-local objects are only accessed by operations within the scope of the function that created the object and are not accessed by any operations of functions in transactions executing in other threads and are not available to operations outside the scope of the creating function. In one or more embodiments of the invention, objects that are created outside of the scope of a function are considered shared objects relative to that function. Objects created independent of any function may be shared (e.g., global) objects relative to all functions of a program. Objects created within the scope of a function may be thread-local relative to that function but shared relative to functions created within the same function. Shared objects may have properties read or written to by any number of operations in any number of functions executing in any number of threads in a system. In one or more embodiments of the invention, a function may create thread-local objects on which to perform operations as well as perform operations on shared objects.

In one or more embodiments of the invention, each object has a corresponding identifier (e.g., identifier A (208), identifier X (216), identifier B (228), identifier Y (236)). In one or more embodiments of the invention, the identifiers provide information regarding whether an object is thread-local or shared. In particular, an identifier includes functionality allowing instrumentation to determine whether a given object is shared between program replicas and their functions executing in two or more transactions. Examples of identifiers include, but are not limited to, the shape of an object and a value stored with the object that identifies the thread in which the transaction that created the object was executed.

In one or more embodiments of the invention, program replicas include instrumentation (e.g., instrumentation A (218), instrumentation N (238)). In one or more embodiments of the invention, instrumentation is program instructions that are added to the program replicas to alter the program execution in some way. In one or more embodiments of the invention, instrumentation is added to a program replica to implement an STM system (e.g., STM system (118) of FIG. 1). Instrumentation may change, modify, or replace operations in functions of a program replica and may also be additional operations added to a function. For example, if a program is represented as an AST, and a function is represented as one or more branches of the AST, instrumentation may take the form of either modified AST nodes, replaced AST nodes, or additional AST nodes that implement an STM system. In one or more embodiments of the invention, the STM system allows for the function to be safely executed in isolation while other functions are executed in other transactions/threads that include operations that potentially manipulate objects shared between the functions.

In one or more embodiments of the invention, instrumentation added to implement an STM system includes functionality to validate the results of operations of functions executed in the STM system as well as to commit the results of the operations in the event that the validation is successful. Validation and commit are discussed further in the description of FIG. 3B, below. In one or more embodiments of the invention, if the intermediate representation of the program is bytecode, instrumentation is modified bytecode instructions. In one or more embodiments of the invention, instrumentation includes compiling the intermediate representation of one or more of a program's functions into machine code. In one or more embodiments of the invention, instrumentation includes functionality to identify, based on the identifier of an object, whether the object is a thread-local object or a shared object. In one or more embodiments of the invention, instrumentation also includes functionality to undo (i.e., revert to original) any of the modifications, replacements, or additions made to AST nodes implementing operations of functions executing in an STM system. In one or more embodiments of the invention, instrumentation includes functionality to verify if speculation made (e.g., by the speculative runtime engine (132) of FIG. 1) regarding a given operation is correct. In such embodiments, if an operation has, for example, been speculated to always use thread-local objects but is actually acting on a shared object, additional instrumentation may be added to implement the STM system, whereas if the speculation remains correct, and the operation still only acts on thread-local objects, then instrumentation to implement the STM system is not added to the operation/function.

While FIG. 2 shows a configuration of components, other configurations may be used without departing from the scope of the invention. For example, various components may be combined to create a single component. As another example, the functionality performed by a single component may be performed by two or more components. Also, although FIG. 2 shows a specific number of program replicas, functions, operations, objects with identifiers, and instrumentations, any number of each of these entities may be present/used without departing from the invention.

Further, although not shown in FIGS. 1-2, software instructions in the form of computer readable program code to perform embodiments of the invention may be stored, in whole or in part, temporarily or permanently, on a non-transitory computer readable medium such as a CD, DVD, storage device, diskette, tape, flash memory, physical memory, or any other computer readable storage medium. Specifically, the software instructions may correspond to computer readable program code that when executed by a processor(s), is configured to perform embodiments of the invention.

Figure 3A:
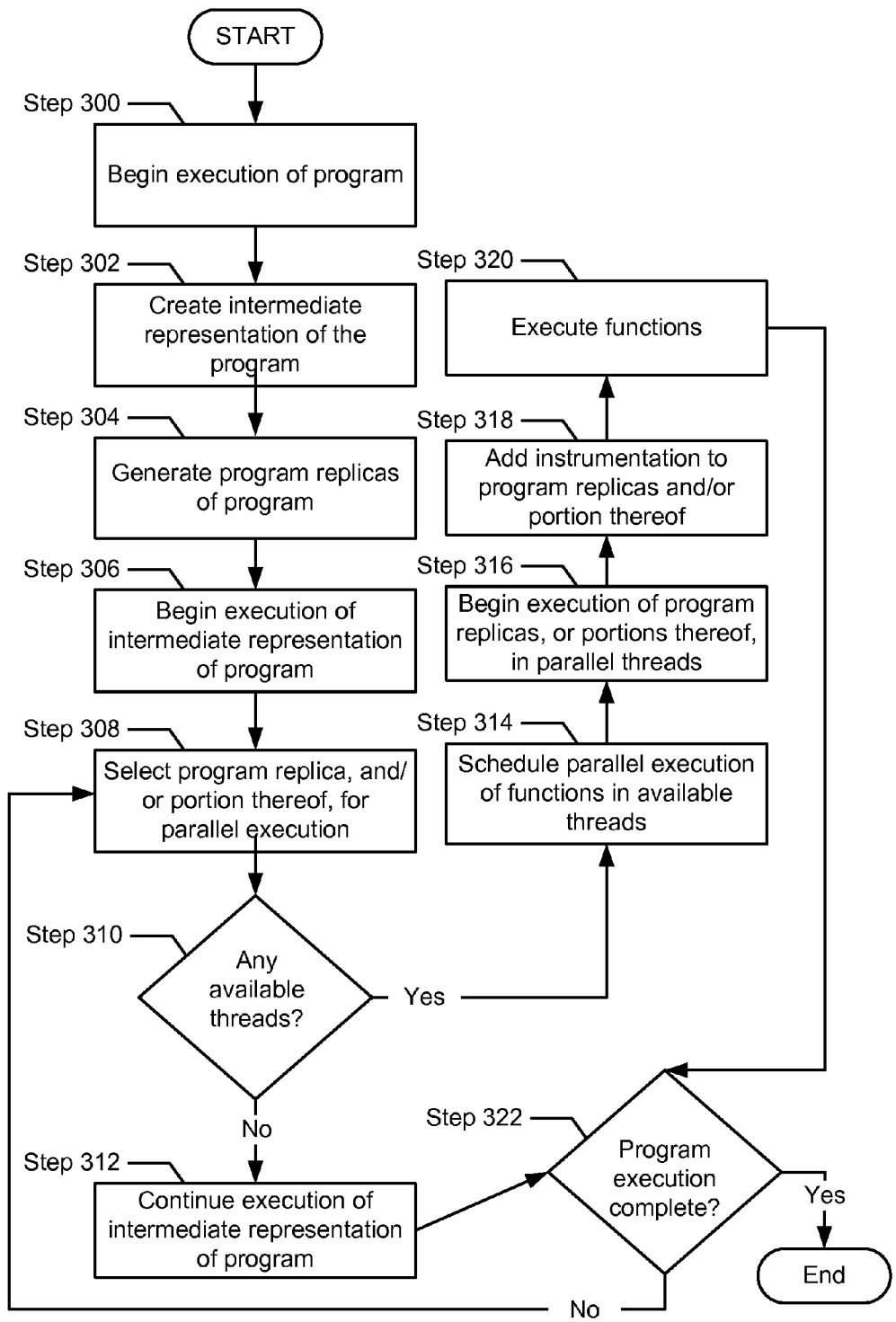
FIGS. 3A, 3B, and 3C show flowcharts in accordance with one or more embodiments of the invention.
Figure 3B:
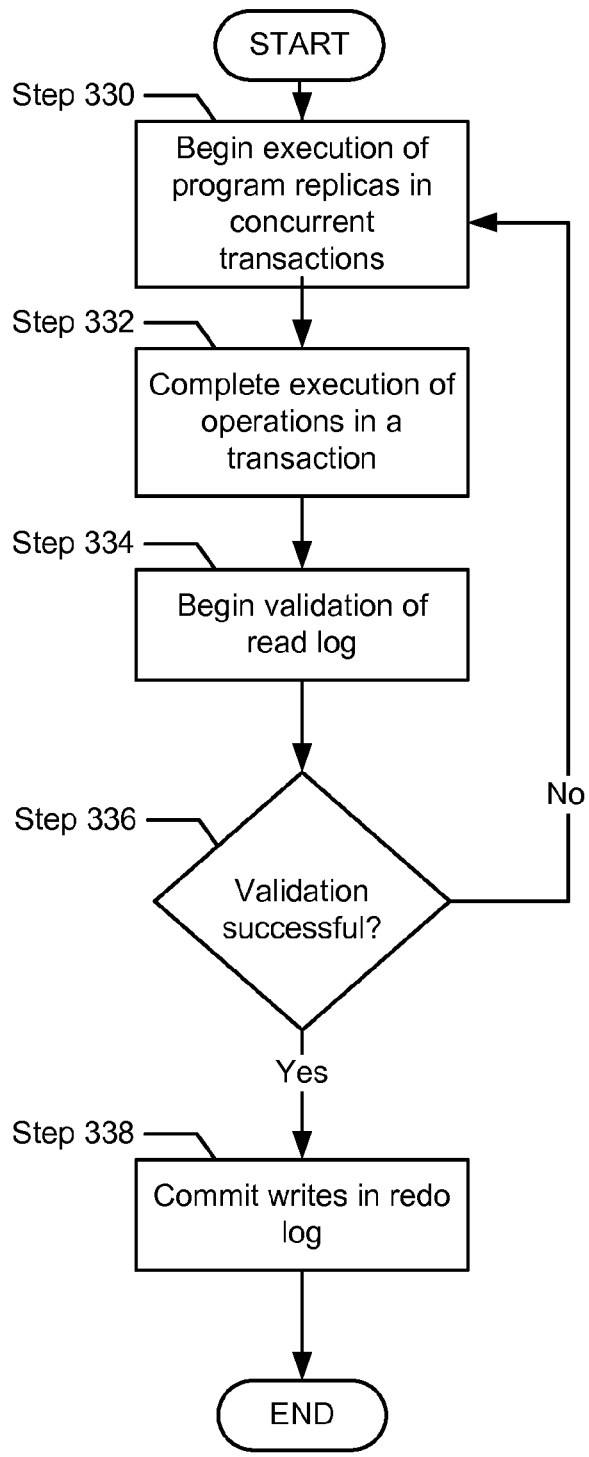
Figure 3C:
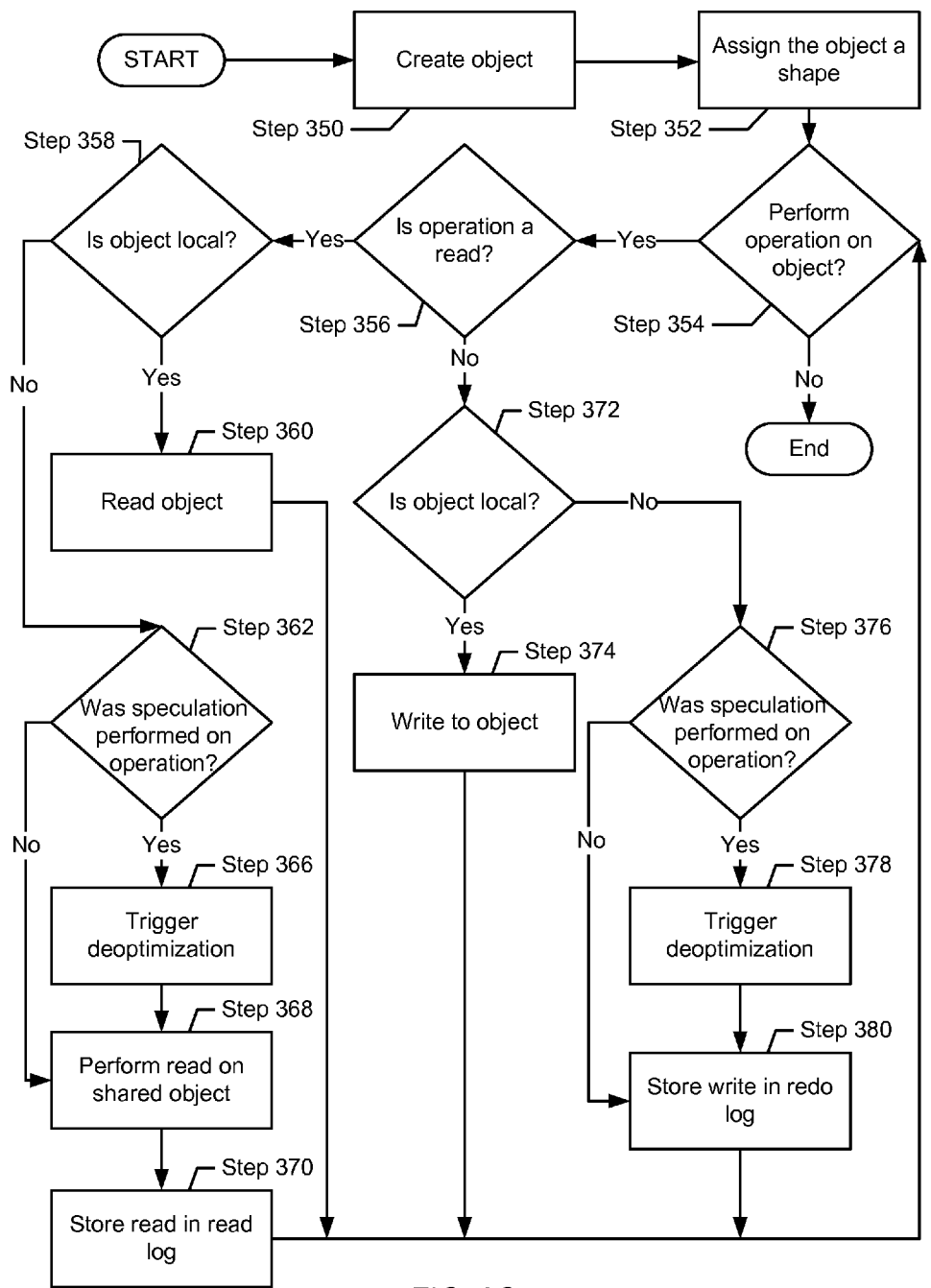

FIGS. 3A, 3B, and 3C show flowcharts in accordance with one or more embodiments of the invention. While the various steps in these flowcharts are presented and described sequentially, one of ordinary skill will appreciate that some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments of the invention. By way of an example, determination steps may not require a processor to process an instruction unless an interrupt is received to signify that condition exists in accordance with one or more embodiments of the invention. As another example, determination steps may be performed by performing a test, such as checking a data value to test whether the value is consistent with the tested condition in accordance with one or more embodiments of the invention.

FIG. 3A shows a method for execution of a program in a speculative STM program execution system. In Step 300, execution of a program begins in the speculative STM program execution system. In one or more embodiments of the invention, execution begins at the request of a user of a computing device. In one or more embodiments of the invention, execution begins as a part of scheduled functionality of a computing device. In one or more embodiments of the invention, execution of the program begins as a result of being invoked by other software running on a computing device.

In Step 302, an intermediate representation of the program is created by the interpreter. In one or more embodiments of the invention, the intermediate representation of the program is designed to be executable by the interpreter. For example, if the interpreter is an AST interpreter, the interpreter may create an AST representation of the source code of the program. In one or more embodiments of the invention, Step 302 is not performed when the system does not have an interpreter. In such embodiments, the system may be designed to compile the source code of the program directly into machine code that is ready for execution.

In Step 304, program replicas are generated in accordance with one or more embodiments of the invention. In particular, the intermediate representation of the program, or a portion thereof (e.g., a function), is replicated per thread of the computing device. In one or more embodiments of the invention, the replication of the program includes replication of the functions within the program. In one or more embodiments of the invention, the program is replicated as many times as the system has available threads in which to execute transactions. In some embodiments, the program is replicated more or fewer times than the number of available threads. For example, if a computing device has eight processing cores with one thread per core, up to eight threads may be used to execute program replicas or portions, such as functions, of the program replicas.

In Step 306, the intermediate representation (e.g., AST, bytecodes, etc.) of the program begins executing in accordance with one or more embodiments of the invention. In one or more embodiments of the invention, the initial portion of the intermediate representation of the program begins executing. For example, if the intermediate representation of the program is an AST, the initial node of the AST is executed.

In Step 308, a program replica, or a portion of the program replica (e.g., an entry function), is selected for execution in a parallel thread in accordance with one or more embodiments of the invention. In one or more embodiments of the invention, portions of the program replica (e.g., functions) are designated and/or selected for parallel execution by being invoked in a unique way in the source code that allows a program execution system, such as the speculative runtime engine of the speculative STM program execution system of the present invention, to identify portions of the program replica that are candidates for parallel execution.

For example, in one or more embodiments of the invention, a specific command in the source code used to call a function alerts the STM system that the function called via the command is a candidate for parallel execution. The use of the specific command may cause the speculative runtime engine to re-construct the function to implement the STM system, taking into account any speculations made by the speculative runtime engine on operations of the function in the event that threads are available in which to execute concurrent transactions.

In Step 310, the process determines if there are any available threads in which to execute the portion of the program replica selected for parallel execution in Step 308. In one or more embodiments of the invention, the determination as to whether a thread is available includes surveying the state of each thread in a system and determining if the processor of a thread is either currently available to execute instruction or has space available in its thread queue in which to place the portion of the program replica that is to be executed as a transaction. If there is a thread available, the process moves to Step 312. If there is no thread available, the process moves to Step 314.

Continuing with Step 312, in Step 312, execution of the intermediate representation of the program continues in accordance with one or more embodiments of the invention. In one or more embodiments of the invention, continuing execution of the intermediate representation after determining that no additional threads are available includes executing the program in a single thread without modifications to implement the STM system and/or to use the speculation capabilities of the speculative runtime engine. In one or more embodiments of the invention, the speculative runtime engine includes functionality to retry, at any interval (e.g., periodic, event-driven, etc.) to begin executing portions of the program replica in parallel. The process then moves to Step 322 (described below).

Turning to Step 314, the process schedules program replicas, or portions of the program replica (e.g., functions), for execution in transactions in parallel threads in accordance with one or more embodiments of the invention. In one or more embodiments of the invention, scheduling execution in parallel threads includes placing the portion of the program replica that is to execute in a given thread into the thread queue of the thread. For example, functions that have been designated for parallel execution may be placed in the thread queues of available threads (discovered in Step 310) as transactions to be executed by the processor corresponding to that thread.

In Step 316, execution of the program replicas begins in the parallel threads in accordance with one or more embodiments of the invention. In one or more embodiments of the invention, beginning execution includes having a function within a program replica that has been placed in a thread queue reaching the "top" of the queue and the instructions that make up the operations of the function begin to be executed by the processor corresponding to the thread.

In Step 318, instrumentation is added to the program replicas (or portions of the program replicas) that are to be executed concurrently in accordance with one or more embodiments of the invention. In one or more embodiments of the invention, instrumentation includes adding to, modifying, or replacing portions of the intermediate representation of the program to implement the STM system. In one or more embodiments of the invention, the instrumentation provides functionality to identify objects as either local to the thread/transaction executing the program replica or not thread-local, and thus potentially shared with other threads executing transactions, making the objects shared objects. For example, if the intermediate representation of the program is an AST, adding instrumentation may include modifying or replacing the nodes (i.e., operations) of the portion of the program AST that constitutes a function, as well as adding additional nodes, to implement the STM system. Instrumentation in the form of added nodes may implement read and write validation and commit operations.

In one or more embodiments of the invention, adding instrumentation includes creating logs and/or lazy clones for recording operations (e.g., reads and/or writes) on potentially shared objects. In one or more embodiments of the invention, adding instrumentation includes adding functionality to validate that a property of an object that was modified during a transaction executed in a thread was not accessed and/or modified by any other concurrently executing transaction in another thread. In one or more embodiments of the invention, adding instrumentation includes adding functionality to the replica of the intermediate representation of the program to commit the results of the operations of the function executed as a transaction in a thread in the event that a successful validation occurs.

In one or more embodiments of the invention, whether or not a given operation (e.g., AST node) is instrumented depends on whether or not the objects on which the operation acts are thread-local or shared objects. In one or more embodiments of the invention, whether or not instrumentation is added to a given operation depends on the results of speculation corresponding to the operation. For example, the speculative runtime engine may include functionality to record profiling information regarding an operation of a transaction executing in a thread. Profiling information includes whether or not the operation has ever acted on a potentially shared object. If the operation has not, then instrumentation to implement the STM system (which may add overhead) may not be added to the operation. If the operation has previously accessed potentially shared objects, then instrumentation may be added to the operation to implement the STM system. In one or more embodiments of the invention, if speculation turns out to have been incorrect, then the system may include functionality to re-execute the transaction with appropriate instrumentation added to implement the STM system, or to execute the program in a non-concurrent manner. Objects are discussed in more detail in the discussion of FIG. 3C below.

In Step 320, the program replicas, or portions of the program replicas such as functions, execute in concurrently executing (i.e., parallel) transactions in accordance with one or more embodiments of the invention. In one or more embodiments of the invention, execution of portions of the program replica in parallel transactions includes executing the instrumented program replicas that have implemented the STM system and been modified based on the results of speculation. In one or more embodiments of the invention, the STM system ensures that the portions of the program executing in parallel transactions are effectively isolated from one another. In one or more embodiments of the invention, execution of the portions of the program replica concurrently includes a validation step added via the instrumentation. In one or more embodiments of the invention, execution includes the ability to re-execute a transaction in the event that validation fails. In one or more embodiments of the invention, concurrent execution of the portions of the program replica designated for parallel execution includes a commit that writes results in the event validation is successful. Validation and commit are discussed further in the description of FIG. 3B, below. The process then moves to Step 322.

In one or more embodiments, Steps 310-318 are performed while the program replicas are executing.

In Step 322, the process determines if program execution is complete in accordance with one or more embodiments of the invention. If the program is not complete, the process returns to Step 308 (described above). If the program execution is completed, the process may proceed to end.

FIG. 3B shows the execution of program replicas and the subsequent validation before writes are committed. While FIG. 3A focuses on the execution of the program as a whole, FIG. 3B focuses on execution of program replicas within the STM system created by the added instrumentation (see, e.g., Step 318 of FIG. 3A). In Step 330, program replicas (or portions of the program replica) begin executing in accordance with one or more embodiments of the invention. In one or more embodiments of the invention, execution occurs in transactions executing in all threads that are available when execution begins.

In Step 332, execution of operations on objects completes in accordance with one or more embodiments of the invention. Operations on objects are discussed in greater detail in the discussion of FIG. 3C below.

In Step 334, the read log validation begins in accordance with one or more embodiments of the invention. In one or more embodiments of the invention, the validation checks that a read at the time of validation would yield the same result as the read that was carried out during execution of the program replica and recorded in a read log. In one or more embodiments of the invention, validation of the read log includes examining the read log to determine for what objects a lazy clone was created and had properties added to the lazy clone during transaction execution. For example, if an operation of a function (i.e., a portion of the program replica) acts on a shared object, a lazy clone of the object is created. The lazy clone may be a copy of the shared object with an initially empty shape. When the operation is to act on a property of the object, the value corresponding to the property may be copied from the shared object into the lazy clone. In one or more embodiments of the invention, validation includes examining the properties added to lazy clones, whose existence and location are recorded in the read log, and determining if the value of the property in the lazy clone still matches the value of the property in the shared object. For example, during the execution of a function in the STM system, a read operation of a string "blue" may be called for on a property of a potentially shared object. The read may be performed by creating a lazy clone of the potentially shared object, and then importing the property (i.e., the string "blue") that the operation is to read. The existence and location of the lazy clone may be noted in the read log. During validation, the STM system checks the read log to determine if any lazy clones were created during the transaction and, if so, where the lazy clones can be found. After discovering the existence of the lazy clone and corresponding location in memory, the read of the property "blue" imported into the lazy clone may be compared to the value of the property in the corresponding potentially shared object to determine if the read value is the same. If the value of the property of the potentially shared object is "blue", then the validation is successful for the operation. In one or more embodiments of the invention, all read operations executing in the STM system concurrently must pass validation before write operation results are committed.

In Step 336, the process determines if the validation is successful in accordance with one or more embodiments of the invention. In one or more embodiments of the invention, successful validation occurs when all reads made by operations conducted during the transaction were successful reads whose read value is the same at the time of validation as at the time of the operation executed in the transaction. In one or more embodiments of the invention, validation is done per property per object. In such embodiments, an object may be modified by two or more operations in two or more transactions without causing failed validation as long as the modifications are on different properties of the object. If validation fails, the process returns to Step 330 and the program replicas, or portions thereof, are re-executed until the validation is successful. If the validation is successful, the process moves to Step 338.

In Step 338, the writes that were stored in the redo log during execution of the program replicas are committed in accordance with one or more embodiments of the invention. In one or more embodiments of the invention, write operations cause a property to be added to a lazy clone that is recorded in a redo log. Committing the written values stored in the lazy clone may include writing the property values in the lazy clone into the corresponding properties of the shared object from which the lazy clone was created. In one or more embodiments of the invention, where the property values written by an operation are recoded in the redo log rather than stored in a lazy clone, committing the results of the write operations includes writing the property values in the redo to the appropriate property of the shared object.

FIG. 3C is a flowchart of an object within the speculative STM program execution system. More specifically, FIG. 3B shows how, after an object is created, read and write operations are performed on the object during execution of the program shown in FIG. 3A.

In Step 350 an object is created in accordance with one or more embodiments of the invention. In one embodiment of the invention, the object is either created outside the program replica or portion thereof (i.e. shared object) or created during execution of the program replica or portion thereof (i.e. thread-local object). In one or more embodiments of the invention, an object is created outside the program and is resident in memory of the VM for access by programs executing in the VM.

In Step 352, in accordance with one or more embodiments of the invention, the object is assigned a shape. For example, if the intermediate representation of the program that was replicated is an AST, the shape may be assigned from the thread-local shape tree corresponding to the AST for the thread. In one or more embodiments of the invention, an object created outside the scope of a function of the program may be assigned a shape that identifies the object as shared and an object created within the scope of a function (e.g., created within the function) may be assigned a shape that identifies the object as thread-local. Alternatively or additionally, an object may be assigned an identifying value to designate the entity that created the object, which may be used to identify if an object is shared or thread-local. Step 352 may be performed by assigning an identifier, discussed above with reference to FIG. 2, to the object.

In Step 354, the process determines whether an operation is to be performed on the object in accordance with one or more embodiments of the invention. In one or more embodiments of the invention, an operation is to be performed on an object if the object is included in the performance of the operation. In one or more embodiments of the invention, operations that may be performed on any given object include, but are not limited to, a read and a write. For example, AST branches may constitute a function, and the nodes corresponding to operations that are attached to the branches may call for a read from or write to an object. If a determination is made that an operation is to be performed on the object, the process moves to Step 356. If the program or function calls for no operation on the object, then the process may move to end.

In Step 356, the process determines, in accordance with one or more embodiments of the invention, if the operation is a read. In one or more embodiments of the invention, an operation is a read if the operation calls for an access of a property of an object in order to discover the value associated with the property. If the operation is a read, the process moves to Step 358. If the operation is not a read, then the operation is a write and the process moves to Step 372.

Continuing with Step 358, the process determines if the object that is to be read is local to the thread in which the program replica is being executed in accordance with one or more embodiments of the invention. In one or more embodiments of the invention, the thread-locality of the object is determined by checking the shape of the object. In one or more embodiments of the invention, the speculative runtime engine includes functionality to examine the shape of an object and determine if the object was created in the scope of the function executing in the thread. In such embodiments, because the shape of an object is dynamic during program execution, the speculative runtime engine includes functionality to check for more than one shape, with the shape of an object being checked for thread-locality being compared with any number of potential shapes that are cached by the system, which is caching shapes as the shapes dynamically change during runtime. In another embodiment of the invention, the thread locality of an object is determined by checking a value assigned to the object when the object was created and stored with the object. If the process determines that the object is local to the thread, the process moves to Step 360. If the process determines that the object is not thread-local (i.e., the object is potentially shared), the process moves to Step 362.

Continuing with Step 360, the object is read in accordance with one or more embodiments of the invention. In one or more embodiments of the invention, reading the object after determining that the object is a thread-local object includes directly accessing the property of the object that is to be read to discover the value of the property. The process then proceeds to Step 354.

Turning to Step 362, if the object is not local, the process determines whether the read operation was subject to speculation that the objects provided as input to the operation will continue to be only thread-local objects in accordance with one or more embodiments of the invention. In one or more embodiments of the invention, profiling information maintained per operation per thread is used to perform the speculation. If the operation has been subject to speculation, the process moves to Step 366. If the operation has not previously been subject to speculation, the process moves to Step 368.

Turning to Step 366, deoptimization of the operation is triggered in accordance with one or more embodiments of the invention. In one or more embodiments of the invention, the triggering of deoptimization causes the system to no longer speculate that the read operation is always given thread-local objects as input. In one or more embodiments of the invention, the deoptimization is achieved, after determining that the operation has used an object is not thread-local (i.e. a shared object), by performing the operation as the operation was represented in the intermediate representation of the program rather than performing the modified version of the operation. For example, rather than using the compiled version of the operation, the interpreted version of the operation may be executed. In one or more embodiments of the invention, deoptimization includes changing the read operation to deal with the possibility of a shared object. In one or more embodiments of the invention, once the read operation is determined to have been subject to an invalidated speculation, the compiled version is deoptimized before the speculative runtime engine can change the speculated state of the read operation from thread local to shared, which ensures that the compiled machine code includes a version of the read operation that is shared. In one or more embodiments of the invention, a thread-local version of the read operation may still be included in the compiled code to support read operations that are potentially thread local and shared, depending on the object that has to be read. In one or more embodiments of the invention, deoptimization includes adding instrumentation to implement the STM system.

In Step 368, a read of a property is performed on the shared object in accordance with one or more embodiments of the invention. In one or more embodiments of the invention, reading a property of the shared object includes creating a lazy clone of the shared object, which is initially empty, and importing the property of the shared object that is to be read into the lazy clone. In such embodiments, once a property has been imported from a shared object into a lazy clone, any additional accesses of the property are performed from the lazy clone rather than re-importing the value from the shared object. In other embodiments of the invention, a read of a property of a shared object includes copying the value of a property of the shared object into a read log.

In Step 370, the value that is read is stored in the read log in accordance with one or more embodiments of the invention. In one or more embodiments of the invention, the "read log" is a combination of a log and a lazy clone. In other words, rather than storing the read values directly in the read log, the read log records that a lazy clone of an object has been created and the location of the lazy clone that stores the values. The actual values of properties imported from the potentially shared object are stored as properties of the lazy clone. In other embodiments, the read log is a log that stored the values of the properties read from shared objects directly. The process then moves to Step 354.

Turning to Step 372, in Step 372, the process determines if the object that is to be written to is local to the thread in which the program replica, or portion thereof, is being executed in accordance with one or more embodiments of the invention. In one or more embodiments of the invention, the thread-locality of the object is determined by checking the shape of the object, similar to the shape check described in Step 358, above. In another embodiment of the invention, the thread locality of an object is determined by checking a value assigned to the object when the object was created and stored with the object. If the process determines that the object is local to the thread, the process moves to Step 374. If the process determines that the object is not thread-local (i.e., the object is potentially shared), the process moves to Step 376.

Continuing with Step 374, a value is written to the object in accordance with one or more embodiments of the invention. In one or more embodiments of the invention, writing to the object after determining that the object is a thread-local object includes directly accessing the property of the object that is to be written and writing a value to the property. The process then proceeds to Step 354.

Turning to Step 376, the process determines, in accordance with one or more embodiments of the invention, whether the write operation was subject to speculation that the objects provided as input to the operation will continue to be only thread-local objects. In one or more embodiments of the invention, profiling information maintained per operation per thread is used to perform the speculation. If the write operation has been subject to speculation, the process moves to Step 378. If the operation has not previously been subject to speculation, the process moves to Step 380.

Turning to Step 378, deoptimization of the write operation is triggered in accordance with one or more embodiments of the invention. In one or more embodiments of the invention, the triggering of deoptimization causes the system to no longer speculate that the write operation is always given thread-local objects as input. In one or more embodiments of the invention, the deoptimization is achieved, after determining that the write operation has used an object is not thread-local (i.e. a shared object), by performing the write operation as the operation was represented in the intermediate representation of the program rather than performing the modified version of the operation. For example, rather than using the compiled version of the operation, the interpreted version of the operation may be executed. In one or more embodiments of the invention, deoptimization includes adding instrumentation to implement the STM system. In one or more embodiments of the invention, deoptimization includes changing the write operation to deal with the possibility of a shared object. In one or more embodiments of the invention, once the write operation is determined to have been subject to an invalidated speculation, the compiled version is deoptimized before the speculative runtime engine can change the speculated state of the write operation from thread local to shared, which ensures that the compiled machine code includes a version of the write operation that is shared. In one or more embodiments of the invention, a thread-local version of the write operation may still be included in the compiled code to support write operations that are potentially thread-local and shared, depending on the object that is to be written to. The process then moves to Step 380.

In Step 380, the value is written to the redo log in accordance with one or more embodiments of the invention. In one or more embodiments of the invention, the "redo log" is actually a combination of a log and a lazy clone. In such embodiments, the log records that a lazy clone of an object has been created and where the lazy clone can be found in memory, while the actual values of properties imported from the shared object and written to are stored as properties of the lazy clone. In other embodiments, the redo log is a log that stored the values of the properties that are to be written in shared objects. The process then moves to Step 354. In Step 354, if there are no more operations on the object, the process ends.

Figure 4:
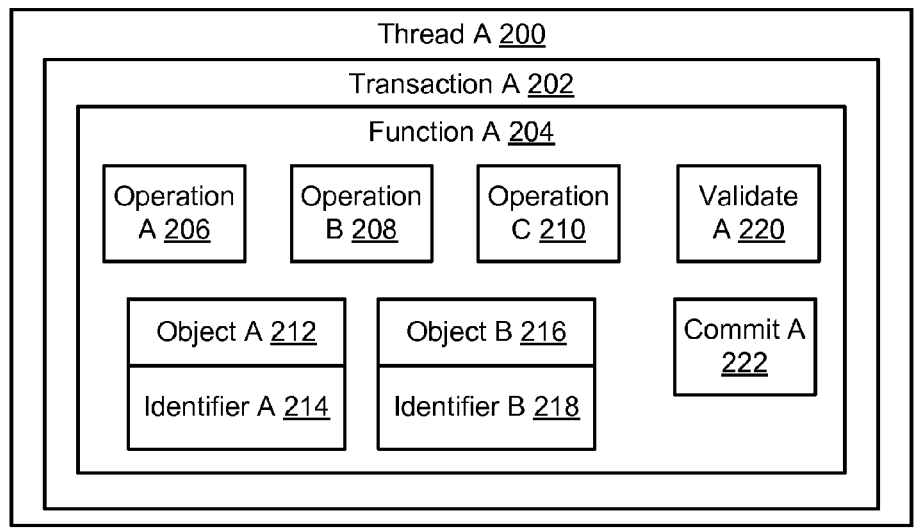
FIG. 4 shows an example in accordance with one or more embodiments of the invention.
Figure 4:
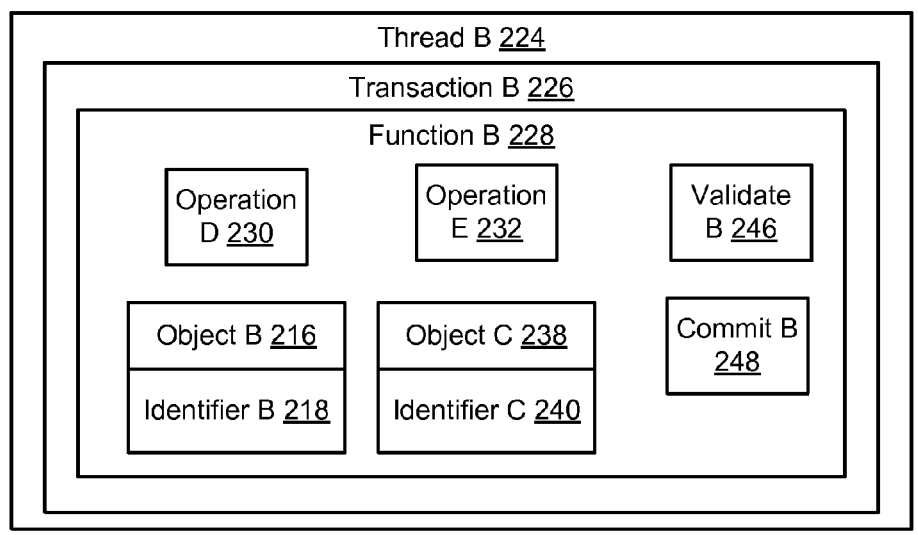

FIG. 4 shows an example in accordance with one or more embodiments of the invention. The following example is for explanatory purposes only and not intended to limit the scope of the invention.

Referring to FIG. 4, consider a scenario in which a VM (not shown) executing on a computing device (not shown) has two threads (e.g., thread A (200), thread B (224)), each corresponding to a physical processor, in which transactions (e.g., transaction A (202), transaction B (226)) may execute. A JavaScript program (not shown) has been interpreted as an AST and replicated twice, once for each thread. In the source code of the program (not shown), two functions (e.g., function A (204), function B (228)) are called using a unique call that informs the speculative STM program execution system running in the VM that the functions are candidates to be executed in concurrent transactions. The functions are therefore scheduled to be executed in transaction A and transaction B concurrently executing in thread A and thread B, respectively.

In this scenario, function A, which is to be executed in transaction A of thread A, includes three operations (e.g., operation A (206), operation B (208), operation C (210)) which act on two objects (e.g., object A (212), object B (216)). Operation A is creates Object A. Object A thus has a shape (e.g., identifier A (214)) that identifies the object as a thread-local object. Object A is as follows:
  var vehicle01={
    make:"Foyota",
    model:"Fundra",
    year:2005}

Object A, as seen directly above, has three properties. The make property has a string value of "Foyota", the model property has the string value of "Fundra", and the year property has the integer value of 2005.

Object B is an object created outside the scope of either function A or function B and thus is a potentially shared object, which may be ascertained via examination of its shape (e.g., identifier B (214)). Object B is as follows:
  var vehicle02={
    make:"Jonda",
    model:"Jelement",
    color:"Orange",
    year:2003}

Object B, as seen directly above, has four properties, make, model, color, and year, which correspond to the string values "Jonda", "Jelement", and "Orange", and the integer value 2003, respectively.

Operation B is a read of the make property of object A (i.e., vehicle01). Operation C is a write to the color property of object B (i.e., vehicle02).

In the first few iterations of operation B in thread A, the speculative runtime engine notes in profiling information that the operation uses thread-local objects. The speculative runtime engine thus replaces the node with a modified version that improves execution speed of the operation. In one or more embodiments of the invention, the modified version of the operation is a compiled version that does not implement the STM system. Operation C, on the other hand, has not been observed executing often enough for the speculative runtime engine to speculate on the objects that Operation C has used, therefore Operation C is instrumented to implement the STM system. The instrumentation is achieved via modification of the AST node of operation C, to, create, when accessing a property of an object, a write log as well as a lazy clone with an initially empty shape of any object on which Operation C acts.

The speculative runtime engine also adds nodes to the AST of function A for the validate (e.g., validate A 220) and commit (e.g., commit A (222)) operations of the STM system.

Function B, which is to be executed in transaction B of thread B, includes two operations (e.g., operation D (230), operation E (232)) which act on two objects (e.g., object B (216), object C (238)). Object B is the same object as described above, which means that object B is shared between function A and function B.

Object C is an object created outside the scope of either function A or function B and thus is a potentially shared object, which may be ascertained via examination of its shape (e.g., identifier C (240)). Object C is as follows:
  var vehicle03={
    make:"Baudi",
    modle:"Q27",
    color:"Blue".
    year:2009}

Object C, as seen above, has four properties, make, model, color, and year, which correspond to the string values "Baudi", "Q27", and "Blue", and the integer value 2003, respectively.

Operation D is a read of the model property of object B (i.e., vehicle02). Operation E is a read of the color property of object C (i.e., vehicle03).

In the first few iterations of operation D in thread B, the speculative runtime engine notes in its profiling information that the operation uses thread-local objects. The speculative runtime engine thus replaces the node with a modified version that improves execution speed of the operation, similar to the replacement of operation B, described above. Operation E, on the other hand, is noted in the first few iterations of Operation E, to sometimes access properties of shared objects, therefore Operation E is instrumented to implement the STM system. The instrumentation is achieved via modification of the AST node of operation E to, when accessing a property of an object, create a read log as well as a lazy clone with an initially empty shape of any objects Operation E acts on.

The speculative runtime engine also adds nodes to the AST of function B for the validate (e.g., validate B (246)) and commit (e.g., commit B (248)) operations of the STM system.

Next, the functions begin execution in their respective transactions concurrently. In function A, operation A executes and creates object A (i.e., vehicle01), which is assigned a thread-local shape. Operation B then reads the make property of object A. Because the speculative runtime engine has speculated that operation B will continue to always use thread-local objects, the AST node of operation B is replaced with a modified (e.g., compiled) version of the operation. The modified version of the operation includes access of the make property as the first property of the object. For example, a fixed offset may be used to access the property rather than having to determine where in the object the make property exists. Additionally, the operation is not instrumented to implement the STM system because the read is on a thread-local object. The modified version of the operation B is executed in the VM with no STM overhead and using a fixed offset, resulting in an efficient read of the make property of vechicle01 as "Foyota".

Operation C of function A is a write to the color property of vechicle02 (i.e., object B). Operation C has been modified to implement the STM system. Therefore, before the write is to occur, a lazy clone is created of vechicle02 that is local to thread A. When the write actually occurs, the value to be written to the color property of vechicle02 is actually written to the lazy clone. Thus, after the write, the lazy clone of vechicle02 no longer has an empty shape and has one property, color, which is written as "Black". The existence and location of the thread A lazy clone of vechicle02 are noted in the redo log (not shown) so that the color property recorded in the lazy clone of vechicle02 can be committed to the shared object in the event of a successful validation.

In function B, operation D is a read of the model property of vechicle02 (i.e., shared object B). The speculative runtime engine has speculated that operation D will continue to only use thread-local objects. However, examination of the shape of object B indicates that object B is not, in fact, a thread-local object. The fact that operation D is acting on a potentially shared object necessitates a deoptimization of operation D. The deoptimization is to revert from a compiled version of the operation to the AST version that is instrumented to implement the STM system, as well as to cease having the speculative runtime engine speculate that the operation will only receive thread-local objects as input. After deoptimization, the read is performed. First, a lazy clone of the object is created that is local to thread B. When the read actually occurs, the value read from the model property of vechicle02 is imported from the shared object B into the lazy clone created for operation D. Thus, after the read, the thread B lazy clone of vechicle02 no longer has an empty shape and has one property, model, which is read as "Jelement". The existence and location of the lazy clone of vechicle02 are noted in the read log (not shown) so that the model property recorded in the lazy clone of vechicle02 can used for later validation.

Operation E of function B is a read of the color property of vechicle03 (i.e., potentially shared object C). The speculative runtime engine has previously determined that operation E has, in the context of thread B, used shared objects during prior executions. Therefore, operation E is instrumented to implement the STM system. Before the read is to occur, a lazy clone is created of vechicle03 that is local to thread B. When the read actually occurs, the value to be read from the color property of vechicle03 is imported from the shared object E into the lazy clone. Thus, after the read, the lazy clone of vechicle03 no longer has an empty shape and has one property, color, which is imported as "Blue". The existence and location of the thread A lazy clone of vechicle02 are noted in the redo log (not shown) so that the color property recorded in the lazy clone of vechicle02 can be used for later validation.

Once the functions have completed execution in their various transactions, the read logs are used for validation. Examination of the read logs determines that operation D and operation E of function B both performed reads on potentially shared objects because there is an entry noting the existence and location of lazy clones created for operation D and operation E. The read values are taken from the lazy clones and compared with the values in the corresponding shared objects. In the case of operation D, the compare produces a match because even though operation C wrote a value to a property of object B, the property written to by operation C was not the same property as the property read by operation D. Operation C wrote to the color property of object B, while operation D read the model property. Because the operations do not conflict, the validation is successful with regard to operation D's read. In the case of operation E, the value read from the color property of object C matches that of the shared object because the color property was not modified during the execution of the transactions.

Because the validation was successful, the redo log is examined to determine if there are any writes to commit. The write to the color property of object B by operation C caused the existence and location of the thread A lazy clone of object B. The color property "Black" is taken from the lazy clone and written to the color property of shared object B and program execution continues. Committing the redo log provides atomicity, ensuring that no other transaction will perform concurrent writes to shared objects in accordance with one or more embodiments of the invention.

While in the above description of the example illustrated by FIG. 4, the modification of operations based on speculation is described as modification to a compiled version. However, one skilled in the art and having the benefit of this disclosure will recognize that, instead of a compiled version, the modified version of the operation may be a version that checks future invocations of the operation to determine if incoming objects are thread-local and, if so, does not implement the STM system.

Figure 5:
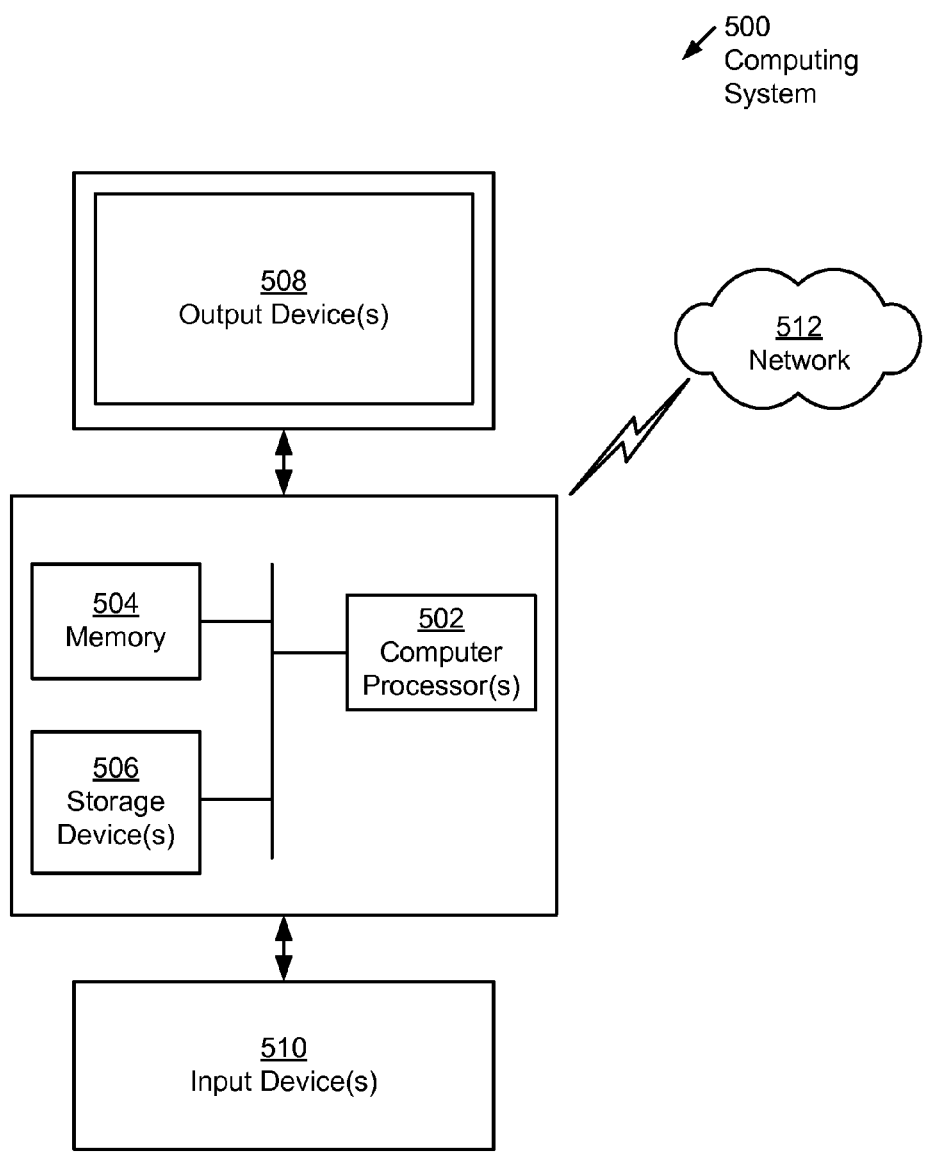
FIG. 5 shows a computing system in accordance with one or more embodiments of the invention.

Embodiments of the invention may be implemented on virtually any type of computing system regardless of the platform being used. For example, the computing system may be one or more mobile devices (e.g., laptop computer, smart phone, personal digital assistant, tablet computer, or other mobile device), desktop computers, servers, blades in a server chassis, or any other type of computing device or devices that includes at least the minimum processing power, memory, and input and output device(s) to perform one or more embodiments of the invention. For example, as shown in FIG. 5, the computing system (500) may include one or more computer processor(s) (502), associated memory (504) (e.g., random access memory (RAM), cache memory, flash memory, etc.), one or more storage device(s) (506) (e.g., a hard disk, an optical drive such as a compact disk (CD) drive or digital versatile disk (DVD) drive, a flash memory stick, etc.), and numerous other elements and functionalities. The computer processor(s) (502) may be an integrated circuit for processing instructions. For example, the computer processor(s) may be one or more cores, or micro-cores of a processor. The computing system (500) may also include one or more input device(s) (510), such as a touchscreen, keyboard, mouse, microphone, touchpad, electronic pen, or any other type of input device. Further, the computing system (500) may include one or more output device(s) (508), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (500) may be connected to a network (512) (e.g., a local area network (LAN), a wide area network (WAN) such as the Internet, mobile network, or any other type of network) via a network interface connection (not shown). The input and output device(s) may be locally or remotely (e.g., via the network (512)) connected to the computer processor(s) (502), memory (504), and storage device(s) (506). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the invention.

Further, one or more elements of the aforementioned computing system (500) may be located at a remote location and connected to the other elements over a network (512). Further, embodiments of the invention may be implemented on a distributed system having a plurality of nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for parallel execution of programs, comprising:
while executing a program in parallel:
creating a first program replica for a first thread,
wherein the first program replica comprises a first intermediate representation of at least a portion of the program, and
wherein the first intermediate representation comprises:
a write operation that writes to a property of a first object that is identified by a first identifier specifying that the first object is either a shared object or a thread local object;
performing a first speculation that the first object is a thread-local object;
performing a first optimization on the write operation based on the first speculation,
wherein performing the first optimization comprises modifying the first intermediate representation to include compiled machine code that allows the write operation to directly write to the property of the first object;
making a determination, using the first identifier, that the first object is either a shared object or a thread-local object;
when the first object is a thread-local object, performing the write operation by writing directly to the property of first object; and
when the first object is a shared object:
de-optimizing the write operation, based on the determination, by undoing the first optimization to obtain a de-optimized write operation;
adding instrumentation to the first intermediate representation to implement a software transactional memory (STM) system for the de-optimized write operation, wherein adding instrumentation to the intermediate representation comprises creating a lazy clone of the first object, the lazy clone having initially no properties;
performing the de-optimized write operation by copying the property of the first object to the lazy clone, and writing to the property of the lazy clone to obtain a modified lazy clone; and
committing the property of the modified lazy clone by copying the property of the modified lazy clone to the property of the first object.

2. The method of claim 1, wherein performing the determination comprises examining a shape of the first object, wherein the shape of the first object comprises a record of a plurality of properties of the first object, a record of a plurality of methods of the first object, and the first identifier.

3. The method of claim 1, further comprising:
creating a second program replica for a second thread,
wherein the second program replica comprises a second intermediate representation of at least a portion of the program, and
wherein the second intermediate representation comprises:
a read operation, and
a second object identified by a second identifier specifying that the second object is a second thread-local object, and
performing a second speculation that the read operation operates only on the second thread-local object;
performing a second optimization on the read operation based on the second speculation;
making a second determination that the read operation will operate on the second object;
making a third determination, using the second identifier, that the second object is the second thread local object; and
performing, based on the third determination, the read operation on a property of the second object.

4. The method of claim 1, further comprising:
performing a validation, using the modified lazy clone, that the execution of the program replica was atomic and isolated; and
committing the property of the modified lazy clone when the validation is successful.

5. The method of claim 1, wherein the first intermediate representation is one selected from a group consisting of an abstract syntax tree and bytecode.

6. The method of claim 1, wherein the compiled version of write operation comprises using a fixed offset to access one of a plurality of properties of the first object.

7. A system for parallel execution of programs, the system comprising:
a data repository for storing a plurality of program replicas;
a plurality of threads each executing on one of a plurality of processors;
a software transactional memory (STM) system;
a speculative runtime engine configured to:
create a first program replica of the plurality of program replicas for a first thread of the plurality of threads,
wherein the first program replica comprises a first intermediate representation of at least a portion of the program, and
wherein the first intermediate representation comprises:
a write operation that writes to a property of a first object that is identified by a first identifier specifying that the first object is either a first shared object or a thread local object;
perform a first speculation that the first object is a thread-local object;
perform a first optimization on the write operation based on the first speculation, wherein performing the first optimization comprises modifying the first intermediate representation to include compiled machine code that allows the write operation to directly write to the property of the first object;
make a determination, using the first identifier, that the first object is either a first shared object or a first thread-local object;
when the first object is a thread-local object, perform the write operation by writing directly to the property of first object; and
when the first object is a shared object:

de-optimize the write operation, based on the determination, by undoing the first optimization to obtain a de-optimized write operation;

add instrumentation to the first intermediate representation to implement the STM system for the de-optimized write operation, wherein adding instrumentation to the intermediate representation comprises creating a first lazy clone of the first object, the lazy clone having initially no properties;

an interpreter configured to perform the de-optimized write operation by:

copying the property of the first object to the lazy clone, and writing to the first property of the first lazy clone to obtain a first modified lazy clone; and commit the property of the modified lazy clone by copying the property of the modified lazy clone to the property of the first object.

8. The system of claim 7, wherein the speculative runtime engine is further configured to perform the determination by examining a shape of the first object, wherein the shape comprises a record of a plurality of properties of the first object, a record of a plurality of methods of the first object, and the first identifier.

9. The system of claim 7, wherein the speculative runtime engine is further configured to:

create a second program replica for a second thread,
wherein the second program replica comprises a second intermediate representation of at least a portion of the program, and
wherein the second intermediate representation comprises:
a read operation, and
a second object identified by a second identifier specifying that the second object is a second shared object, and
wherein the second program replica corresponds to a second copy of the program;

perform a second speculation that the read operation operates only on a second thread-local object;

perform a second optimization on the read operation based on the second speculation;

make a second determination that the read operation will operate on the second object;

make a third determination, using the second identifier, that the second object is the second shared object; and de-optimize the read operation, based on the third determination, by undoing the second optimization to obtain a de-optimized read operation;

add instrumentation to the second intermediate representation to implement the STM system for the de-optimized read operation, wherein adding instrumentation to the intermediate representation comprises creating a second lazy clone of the second object; and wherein the STM system is further configured to:

perform the de-optimized read operation by copying a second property of the second object to the second lazy clone to obtain a second modified lazy clone, and reading the second property from the second modified lazy clone.

10. The system of claim 9, wherein the STM system is further configured to:

perform a validation, using the first modified lazy clone that the execution of the first program replica was atomic and isolated, and commit the first property of the first modified lazy clone by writing to a corresponding property of the first object when the validation is successful.

11. The system of claim 9, wherein the STM system is further configured to perform a validation, using the second modified lazy clone, that execution of the second program replica was atomic and isolated, wherein performing the validation comprises determining that the second property of the second modified lazy clone matches a corresponding property of the second object.

12. The system of claim 7, wherein the first is one selected from a group consisting of an abstract syntax tree and bytecode.

13. The system of claim 7, wherein the compiled version of the write operation comprises using a fixed offset to access one of a plurality of properties of the first object.

14. A non-transitory computer readable medium comprising instructions which, when executed by a computer, cause a computer processor to:

while executing a program in parallel:

create a first program replica for a first thread,
wherein the first program replica comprises a first intermediate representation of at least a portion of the program, and
wherein the first intermediate representation comprises:
a write operation that writes to a property of a first object, that is identified by a first identifier specifying that the first object is either a shared object or a thread local object;

perform a first speculation that the first object is a thread-local object;

perform a first optimization on the write operation based on the first speculation, wherein performing the first optimization comprises modifying the first intermediate representation to include compiled machine code that allows the write operation to directly write to the property of the first object;

make a second determination, using the first identifier, that the first object is either a shared object or a thread-local object;

when the first object is a thread-local object, performing the write operation by writing directly to the property of first object; and when the first object is a shared object:

de-optimize the write operation, based on the determination, by undoing the first optimization to obtain a de-optimized write operation;

add instrumentation to the first intermediate representation to implement a software transactional memory (STM) system for the de-optimized write operation, wherein adding instrumentation to the intermediate representation comprises creating a lazy clone of the first object, the lazy clone having initially no properties;

perform the de-optimized write operation by copying the property of the first object to the lazy clone, and writing to the property of the lazy clone to obtain a modified lazy clone; and committing the property of the modified lazy clone by copying the property of the modified lazy clone to the property of the first object.

* * * * *

UNITED STATES PATENT AND TRADEMARK OFFICE
CERTIFICATE OF CORRECTION

PATENT NO. : 9,766,926 B2  
APPLICATION NO. : 14/170506  
DATED : September 19, 2017  
INVENTOR(S) : Daniele Bonetta et al.

Page 1 of 1

It is certified that error appears in the above-identified patent and that said Letters Patent is hereby corrected as shown below:

On the Title Page

On page 2, in the second column under OTHER PUBLICATIONS, Line 3, "Strongy" should read -- Strongly --.

In the Specification

Column 22, Line 7, "modle:" should read -- model: --.

Column 22, Line 52, "vechicle01" should read -- vehicle01 --.

Column 22, Lines 54, 56, 58, 60, 62, 64, and 67, as well as Column 23, Lines 14, 16, 19, 20, 35, and 36, "vechicle02" should read -- vehicle02 --.

Column 23, Lines 23, 28, 30, and 32, "vechicle03" should read -- vehicle03 --.

In the Claims

Claim 1, Column 25, Line 27, "thread local" should read -- thread-local --.

Claim 14, Column 28, Line 33, "thread local" should read -- thread-local --.

Signed and Sealed this  
Second Day of July, 2019

Andrei Iancu  
*Director of the United States Patent and Trademark Office*